United States Patent Office 3,661,940
Patented May 9, 1972

1

3,661,940
DERIVATIVES OF 21-METHYL-19-NORPREGNANES
Robert V. Coombs, Summit, and Eugene E. Galantay, Morristown, N.J., assignors to Sandoz-Wander, Inc., Hanover, N.J.
No Drawing. Filed Apr. 13, 1970, Ser. No. 28,554
Int. Cl. C07c 169/34
U.S. Cl. 260—397.3          16 Claims

ABSTRACT OF THE DISCLOSURE

The compounds are 21-methyl-19-norpregnane derivatives bearing a double bond in the 17(20)-position and a keto-group in the 21-position, e.g., 21-methyl-19-nor-4,17(20)-pregnadiene-3,21-dione. Said compounds are useful as pharmaceutical agents, and may be obtained by treatment of a 17-alpha-propadienyl, 17-beta-hydroxy-substituted steroidal compound, e.g. with a protonating agent.

This invention relates to steroidal compounds and more particularly to 21-methyl-19-norpregnane derivatives. This invention also relates to the preparation of such compounds and intermediates thereof.

According to this invention, compounds are provided having the formula (Compounds I)

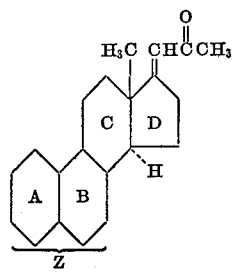

wherein Z embracing rings A and B and the substituents thereon represents

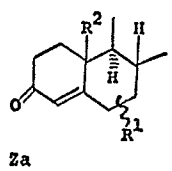

Za or

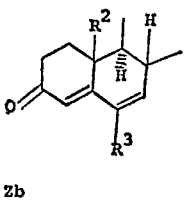

Zb

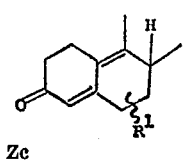

Zc in which $R^1$ represents hydrogen, a 6α-methyl group or a 7α-methyl group,
$R^2$ represents hydrogen or a methyl group, and
$R^3$ represents hydrogen, halogen having an atomic weight of from 19 to 36, i.e. fluoro or chloro, or a methyl group.

According to this invention, Compounds I are provided by acidic treatment (Process a) of a Compound II, i.e. a corresponding 17α-propadienyl-17β-hydroxy steroidal compound:

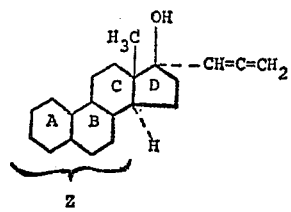

II

Such acidic treatment (Process a) may be carried out employing as the "acidic" source a strong protonating agent in the presence of hydroxy, (lower) acyloxy or (lower) alkoxy anion, in a suitable medium, at moderate temperatures, e.g., 10° to 100° C. preferably at 15° to 35° C. Where the hydroxy, (lower) acyloxy or (lower) alkoxy contributing agent is a liquid under the process conditions, it may be used in excess to serve as the medium.

Strong protonating agents include mineral acids, such as HCl, or sulfuric acid, and aromatic- or (lower) aliphatic sulfonic acids, such as p-toluenesulfonic acid. Suitable hydroxy, (lower) acyloxy or (lower) alkoxy anion contributing agents include lower alkanols, such as methanol, esters such as ethyl orthoformate, or organic acids or anhydrides, such as acetic acid or acetic anhydride, singly or in mixtures.

The term (lower) acyloxy is herein intended to include those groups having from 2 to 4 carbon atoms, such as acetoxy, propionyloxy and butyryloxy, preferably acetoxy; while the term (lower) alkoxy is intended to include those groups having from 1 to 4 carbon atoms, such as methoxy, ethoxy, propoxy, and butoxy, and their isomeric forms, preferably those which have straight chains.

As will be readily appreciated by those skilled in the art, in the preparation of Compounds I, various intermediates may be used having "protected" forms, as described below:

When the desired Z structure is Za where $R^2$=H, then the group as protected may be as represented by Formula P1 or P2,

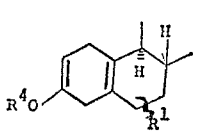

(P1)

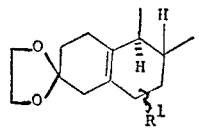

(P2)

in which $R^1$ has the above significance and $R^4$ represents tetrahydropyran-2yl, tetrahydrofuran-2-yl or an alkyl group containing from 1 to 4 carbon atoms, and is preferably methyl.

When the desired Z structure is Za, where $R^2=CH_3$, then the group as protected may be as represented by Formula P3, (P3)

in which $R^1$ is as defined above.

When the desired Z structure is Zb where $R^2=H$, then the group as protected may be as represented by Formula P4

(P4)

in which $R^3$ is as defined above.

When the desired Z structure is Zb, where $R^2=CH_3$ then the group as protected may be as represented by Formula P5, (P5)

in which $R^3$ and $R^4$ have the above significance.

When the desired Z structure is Zc, then the group as protected may be as represented by Formula P6 or P7

(P6)

(P7)

in which $R^1$ and $R^4$ have the above significance.

It will be readily appreciated that the conversion of any "protected" compound to its corresponding Compound I regardless of whether Z=Za, Zb or Zc may be accomplished by employing the acidic conditions of Process a.

It will further be appreciated that the particular Compound I, 21-methyl - 19 - nor-4,17(20)-pregnadiene-3,21-dione is obtained by carrying out Process a on 17α-propadienyl-5(10)-estren-17β-ol-3-one.

The above-described Compounds II are obtainable by reducing (Process b1) an appropriate quaternary salt, i.e., a Compound III,

III wherein Z is as defined above and each of R', R'' and R''' is, independently, lower alkyl, e.g., having from 1 to 3 carbon atoms, such as methyl, ethyl, n-propyl and isopropyl; R' and R'' may be joined to form in conjunction with the nitrogen atom, a ring having from 4 to 6 carbon atoms, such as a pyrrolidino or piperidino group; and X is a nucleofugal leaving group such as a monovalent ion of a halogen atom having a molecular weight of from 35 to 127; i.e, chloro, bromo or iodo, or mesylate ion, tosylate ion or the like; with a complex hydride, such as lithium aluminum hydride, in an inert organic solvent, e.g., diethyl ether or tetrahydrofuran, e.g., at a temperature of from −80° to +80° C.; neither the solvent nor the temperature conditions being critical. Preferably, R', R'' and R''' are the same, and it is particularly preferred they are all methyl.

A 3-keto group of the Z portion of a Compound III would be affected by the reducing conditions of Process b1 hence, the Z portion of a Compound III should be in the protected form (P). In the description of the preparation of Compounds III given hereinafter, it is understood that rings A, B and C are as identified above, and need not be defined.

The quaternary ammonium salt (Compound III) used in Process b1, may be obtained by quaternizing (Process b2) a suitable 17α-[N,N-di(lower)alkylaminopropynyl]-17β-hydroxy steroidal compound, i.e. a Compound IV, the D ring of which is conveniently represented by the structural formula:

(IV)

wherein R' and R'' are as defined above, with a suitable lower alkyl-containing agent, i.e., a Compound V, $$R'''X$$ (V)

wherein R''' and X are as defined above.

The quaternization (Process b2) may be carried out in the conventional manner, e.g., in a suitable solvent, such as acetone, at a temperature of from −20° to +30° C.; neither the solvent nor the temperature conditions being critical. A preferred Compound V is methyl iodide.

The dialkylamino-group containing compound (Compound IV) used in Process b2 may be obtained by condensing (Process c), an approriate 17α-ethynyl-17β-hydroxy steroidal compound, i.e. a Compound VI, the D ring of which may be conveniently represented by the formula:

(VI)

with a suitable geminal amino alcohol, i.e. a Compound VII (VII)

wherein R' and R'' are as defined above.

The condensation (Process c) can be carried out under conditions conventionally employed in carrying out Mannich reactions. Preferably Process c is carried out in the presence of cuprous ions and small amounts of weak acid (e.g., acetic acid), at temperatures of from about 10° to 80° C., preferably from about 50° to 70° C. in an inert organic solvent, such as dioxane or tetrahydrofuran. A preferred source of cuprous ion is cuprous chloride.

Alternatively, Compounds IV may be prepared by reacting (Process d1) a suitable 17-keto-steroid (a Compound VIII), the D ring of which may be conveniently represented by the formula:

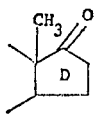

(VIII)

with a suitable organo-metallo reagent (Compound IX)

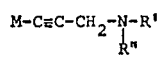

(IX)

wherein R' and R" are as defined above, and M is an equivalent unit of either an active metal or a polyvalent active metal halide, e.g. an alkali metal, such as lithium, potassium or sodium, aluminum, zinc, or magnesium bromide or iodide to obtain an intermediate (Compound X) which on hydrolysis (Process d2) yields the desired Compound IV.

Process d1 may be carried out under conditions conventionally employed in carrying out "Grignard-type" reactions, e.g., in an aprotic organic medium at a temperature of from about −30° C. to 100° C., preferably from about −20° C. to 50° C. followed by standard hydrolysis (Process d2) of the resulting M salt of the resultant Compound IV in an aqueous medium, e.g., water or a highly concentrated aqueous salt solution, e.g., saturated ammonium chloride solution. The medium used is dependent upon the composition of the organo-metallo reagent. For example, if M is MgBr, MgI or Li, the medium may be ether or tetrahydrofuran, if M is Na, the medium may be liquid ammonia-ether, liquid ammonia-tetra-hydrofuran, dioxane, pyridine or dioxane-pyridine. In Process d1, the temperature and medium are not critical. Likewise, in Process d2, the temperature and hydrolyzing solution are not critical.

The above-described starting materials and reactants, e.g., reducing agent, Compounds V, VI, VII, VIII and IX are known and may be prepared as described in the literature, or where not known may be prepared by methods analogous to those described in the literature.

The starting material (Compound III) for the reduction step (Process b1) should be in a protected form, otherwise a 3-keto function of a Z moiety could be affected, if present. Accordingly, once Compound II is obtained, in the protected form, it may then be "deprotected" by acid treatment or alternatively, used in the protected form in Process a resulting in conversion of such protected Compound II to the corresponding "deprotected" Compound I, i.e., the reaction at the 17-position (Process a) and "deprotection" occurring concomitantly.

Conversion of a "protected" form of compound, i.e. from its P form to its corresponding Z form, is achieved by "acid-rearrangement" under conditions conventionally employed for cleaving a 3-enol ether on a 2,5(10) unsaturated steroid or an ethylenedioxy on a saturated benzinoid ring to a 3-keto-4-unsaturated steroid, i.e. (Process p). Process p may be effected under vigorous conditions, e.g., with oxalic acid or hydrochloric acid, at a pH value for example between 1 and 2, or if desired may be effected under milder conditions preferably with oxalic acid, acetic acid or generally in acid media with pH value above 2 and preferably between 3 and 5, and preferably for a period of at least about 3 hours. Either procedure may be carried out, e.g. at temperatures from, 0° to 50° C., and if desired, in the presence of suitable inert organic solvent, such as a lower alkanol, e.g., methanol, when mineral acid is employed; however, when the acid reactant is liquid it may be employed in excess to serve as solvent, e.g., acetic acid.

The above-described processes are conveniently represented by the following reaction scheme in which only the D rings of the compounds are depicted:

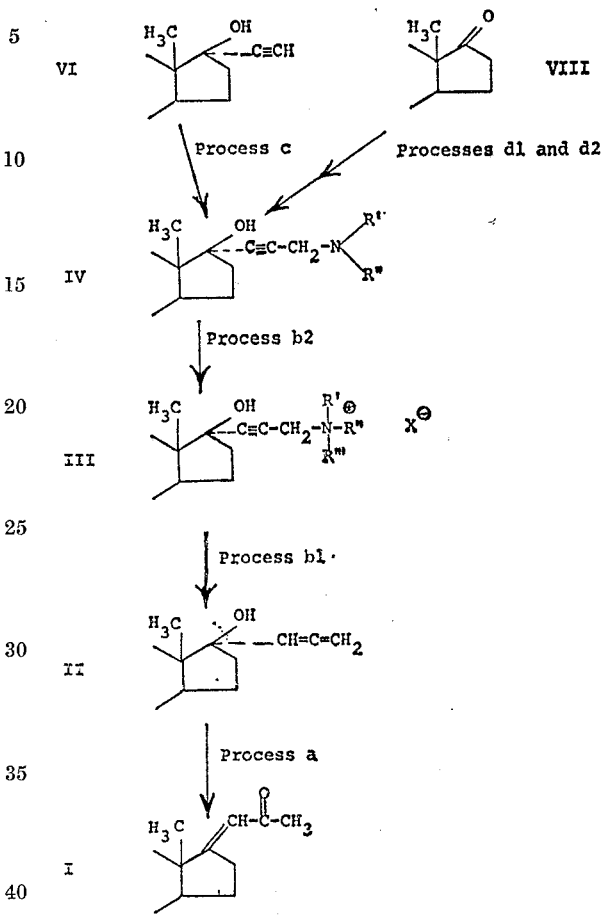

The Compounds I, of this invention are useful because they possess pharmacological properties in animals. In particular, such compounds are useful as fertility control agents in animals, as they possess progestational activity as indicated by standard tests, e.g., the well known Clauberg test or the method basically described in Endocrinology, 63 (1958), 464.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 1 milligram to 20 milligrams. This daily dosage is preferably given in single or equally divided doses, e.g., 1 to 2 times a day, or in sustained release form. It will be appreciated by those skilled in the art, that the daily dosage level is independent of body weight. Dosage forms suitable for internal administration comprise from about 0.5 milligram to 20 milligrams of the compound in admixture with a solid or liquid pharmaceutical carrier or diluent.

The preferred pharmaceutical compositions from the standpoint of preparation and ease of administration are solid compositions, particularly hard-filled capsules and tablets containing from about 0.5 milligram to 20 milligrams of the active ingredient. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agent, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Capsules may contain the active ingredient alone or admixed with an inert solid diluent, e.g., calcium carbonate, calcium phosphate and kaolin. Compositions comprising a Compound I and a solid carrier or diluent are preferred.

A representative formulation suitable for oral administration is a capsule prepared by standard techniques which contains the following.

| Ingredients: | Parts by weight |
|---|---|
| 21 - methyl - 19 - nor - 4,17(20)-pregnadiene-3,21-dione | 1 |
| Inert solid diluent (starch, lactose or kaolin) | 349 |

The following examples are provided as illustrative of the present invention. However, it is to be understood that the examples are for the purpose of illustration only and are not intended as in any way limiting the scope of the invention. In the examples all temperatures are centigrade and room temperature is 25°, unless indicated otherwise.

EXAMPLE 1

21-methyl-19-nor-4,17(20)-pregnadiene-3,21-dione

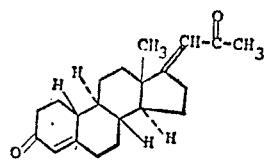

Step A.—17α-dimethylaminopropynyl - 3 - methoxy-2,5(10)estradien-17β-ol:

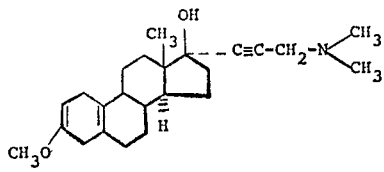

To a Grignard mixture, prepared from 1.50 g. of magnesium, 4.68 g. of ethyl bromide and 70 ml. of tetrahydrofuran, there is dropwise added 5.3 g. of dimethylaminopropyne, dissolved in 10 ml. of tetrahydrofuran. After the evolution of ethane ceases, a solution of 1.716 g. of 3-methoxyestra-2,5(10)-dien-17-one in 30 ml. of tetrahydrofuran is dropwise added, the temperature being 0–5° C. during the addition and 20–25° C. for 4 further hours. Aqueous 2 N sodium hydroxide solution (100 ml.) is added and the mixture concentrated in vacuo at temperatures not exceeding 30° C. until the total volume is 100 ml. The concentrated mixture is then extracted with ether (× 25 ml.), using a centrifuge to facilitate separation from the salt-containing aqueous phase. The product of this step (A) is obtained by evaporating the dried ethereal solutions and pumping off any excess dimethylaminopropyne present.

Step B.—17α - dimethylaminopropynyl - 3 - methoxy-2,5(10)estradien-17β-ol methiodide:

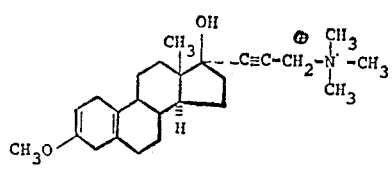

2 g. of the product of Step A is dissolved in 30 ml. of acetone. After addition of 3.5 g. of methyl iodide, the mixture is kept at +8° for 18 hours. The title product of this step (B) crystallizes and is isolated by filtration and washing with anhydrous ether.

Step C.—3 - methoxy - 17α - propadienyl - 2,5(10) estradien-17β-ol:

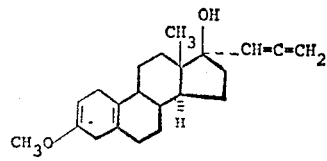

To a suspension of 2.500 g. of the methiodide of Step B, in 50 ml. of tetrahydrofuran, there is added, at −75°, 9.3 ml. of a 0.525 molar lithium aluminum hydridetetrahydrofuran solution. The mixture is brought to −10° where it is stirred until a clear solution is obtained (about 90 minutes). Finally it is kept at room temperature for 12 hours. 100 ml. of 2 N aqueous NaOH solution containing 50 mg. ditert.-butylcresol is added and the mixture concentrated in vacuo until the total volume is 100 ml. Extraction with 5× 20 ml. ether on the centrifuge, drying the ethereal solutions over $K_2CO_3$ and evaporation gives the title product of this step (C), i.e., 3-methoxy-17α-propadienyl-2,5(10)estradien-17β-ol.

Step D.—17α-propadienyl-4-estren-17β-ol-3-one:

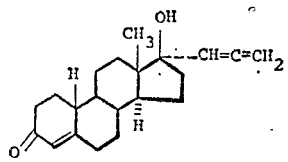

5.5 g. of the product of Step C (17α-propadienyl-3-methoxy-2,5(10)estradien-17β-ol) is dissolved in a mixture of 50 ml. of methanol and 1.5 ml. of 11 N aqueous hydrochloric acid and is kept at 30° C. for 30 minutes. After dilution with 100 ml. of water, the product is extracted with methylene chloride (5× 15 ml.). Evaporation of the dried methylene chloride solutions, followed by recrystallization of the residue from methanol yields the pure compound, 17α-propadienyl-4-estren-17β-ol-3-one.

Step E.—21 - methyl - 19 - nor - 4,17(20) - pregnadiene-3,21-dione:

A solution of 312 mg. of 17α-propadienyl-4-estren-17β-ol-3-one (product of Step D) and 0.5 ml. of 11 normal hydrochloric acid in 10 ml. of methanol is stored at room temperature for 1 hour. Water is then added (2 ml.) and the mixture kept again 1 hour at room temperature. Then, 20 ml. of 5% aqueous sodium acetate solution is added and the title product extracted twice with 10 ml. portions of ethyl acetate. The combined ethyl acetate extracts are washed and dried over sodium sulfate then evaporated to obtain the title product which is then purified by chromatography on silica gel G and crystallized (from ether), M.P. 130–1°.

Carrying out the procedure of Step E but using an equivalent amount of:

(a) 3 - methoxy - 17α - propadienyl - 2,5(10)estradien-17β-ol (product of Step C) or (b) 3 - ethylenedioxy - 17α - propadienyl-5(10)-estren-17β-ol, in place of the 17α-propadienyl-4-estren-17β-ol-3-one used therein, there is obtained the title product of this example (1) i.e., 21-methyl-19-nor-4,17(20)-pregnadiene-3,21-dione.

EXAMPLE 2

21-methyl-19-nor-4,17(20)-pregnadiene-3,21-dione 312 mg. of 17α - propadienyl - 4 - estren - 17β - ol - 3-one (product of Step D of Example 1), is dissolved in a solution of 200 mg. p-toluenesulfonic acid hydrate in 10 ml. of ethanol (90%) and kept at 25° for 18 hours. Water is then added and the product recovered and purified as described in Step E of Example 1.

EXAMPLE 3

21-methyl-19-nor-4,17(20)-pregnadiene-3,21-dione 312 mg. of 17α - propadienyl - 4 - estren - 17β - ol - 3-one is dissolved in acetic anhydride (3 ml.) containing 200 mg. of p-toluenesulfonic acid hydrate and heated to 50° for 20 minutes. After pouring on ice, the mixture is allowed to stand for 24 hours, and the product recovered as described in Step E of Example 1.

EXAMPLE 4

21-methyl-19-nor-4,17(20)-pregnadiene-3,21-dione 312 mg. of 17α - propadienyl - 4 - estren - 17β - ol - 3-one is dissolved in a mixture of 3 ml. ethyl orthoformate, 0.1 ml. of absolute ethanol and 30 mg. of p-toluenesulfonic acid. After heating for 20 minutes at 50°, the reaction mixture is poured on ice and the title compound recovered and purified as described in Step E of Example 1.

EXAMPLE 5

6α-21-dimethyl-4,17(20)-pregnadiene-3,21-dione

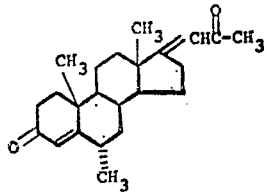

Carrying out the procedures described in Steps A, B and C of Example 1, but using an equivalent amount of 3 - ethylenedioxy - 6α - methylandrost - 5 - en - 17 - one in place of the 3 - methoxyestra - 2,5(10) - dien - 17 - one used therein, there is obtained 3 - ethylenedioxy - 6α-methyl - 17α - propadienyl - 5 - androsten - 17β - ol, which upon treatment by the procedure described in Step E of Example 1, yields the title compound, i.e., 6α,12-dimethyl-4,17(20)-pregnadiene-3,21-dione.

Alternatively, treating the 3-ethylenedioxy-6α-methyl-17α-propadienyl-5-androsten-17β-ol mentioned above by the procedure described in Step D of Example 1, there is obtained 6α-methyl-17α-propadienyl-4-androsten-17β-ol-3-one, which upon treatment by the procedure described in Step E of Example 1 yields the title compound.

EXAMPLE 6

6-chloro-21-methyl-4,6,17(20)-pregnatriene-3,21-dione

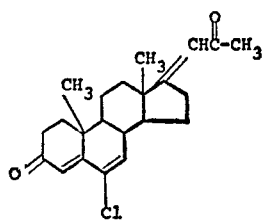

Carrying out the procedures described in Steps A, B and C of Example 1, but using an equivalent amount of 6-chloro-3-ethylenedioxy-4,6-androstadien - 17 - one, in place of the 3-methoxyestra-2,5(10)-dien-17-one used therein, there is obtained 6-chloro-3-ethylenedioxy-17α-propadienyl-4,6-androstadien-17β-ol, which upon treatment by the procedure described in Step E of Example 1, yields the title compound, i.e., 6-chloro-21-methyl-4,6,17-(20)-pregnatriene-3,21-dione.

Alternatively, treating the 6-chloro-3-ethylene-dioxy-17α-propadienyl-4,6-androstadien-17β-ol by the procedure described in Step D of Example 1, there is obtained 6 - chloro-17α-propadienyl-4,6-androstadien-17β-ol-3-one, which upon treatment by the procedure described in Step E of Example 1, yields the title compound.

EXAMPLE 7

21-methyl-19-nor-4,9,17(20)-pregnatriene-3,21-dione

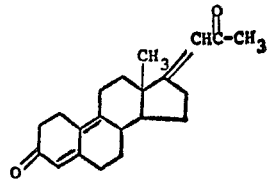

Following the procedures described in Steps A, B and C of Example 1, but using 3-ethylenedioxyestra-5(10), 9(11)-dien-17-one in place of the 3-methoxyestra-2,5-(10)-dien-17-one used therein, there is obtained 3-ethylenedioxy-17α-propadienyl - 5(10),9(11) - estradien-17β-ol, which upon treatment by the procedure described in Step D of Example 1, yields 17α-propadienyl-4,9-estradien-17β-ol-3-one, which upon treatment by the procedure described in Step E of Example 1, yields the title compound, i.e., 21 - methyl - 19-nor - 4,9,17(20)-pregnatriene-3,21-dione.

Alternatively, treating the 3-ethylenedioxy-17α-propadienyl-5(10),9(11)-estradien-17β-ol by the procedure described in Step E of Example 1, yields the title compound.

EXAMPLE 8

21-methyl-19-nor-4,17(20)-pregnadiene-3,21-dione

Step A.—17α - propadienyl-5(10)-estren-17β-ol-3-one: 3-methoxy-17α-propadienyl-2,5(10)-estradien-17β-ol (2.0 g.) (obtainable by Step C of Example 1) is dissolved in a mixture of 20 ml. of glacial acetic acid and 2 ml. of water. After 2 hours, 200 ml. of water is added and the product extracted with ethyl acetate (5× 10 ml.). Evaporation of ethyl acetate extracts yields 17α-propadienyl-5(10)-estren-17β-ol-3-one as a crystalline solid.

Step B.—21-methyl-19-nor-4,17(20)-pregnadiene-3,21-dione: Carrying out the procedure described in Step E of Example 1, but replacing the 17α-propadienyl-4-estren-17β-ol-3-one used therein with 17α-propadienyl-5(10)-estren-17β-ol-3-one (obtained in Step A, above), there is obtained 21-methyl-19-nor-4,17(20)-pregnadiene-3,21-dione.

What is claimed is:

1. A compound having the formula:

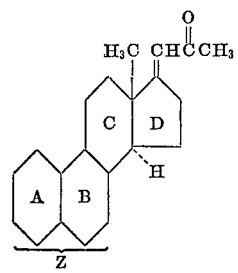

wherein Z embracing rings A and B and the substituents thereon represents

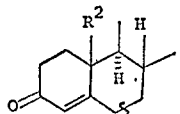
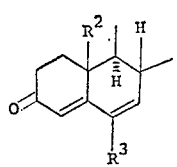

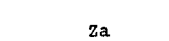

za zb or

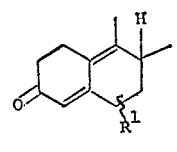

zc in which $R^1$ represents hydrogen or a 6α-methyl group,
$R^2$ represents hydrogen or a methyl group, and
$R^3$ represents hydrogen, chloro, or a methyl group.

2. The compound of claim 1 which is 21-methyl-19-nor-4,17(20)-pregnadiene-3,21-dione.

3. The compound of claim 1 which is 6α-21-dimethyl-4,17(20)-pregnadiene-3,21-dione.

4. The compound of claim 1 which is 6-chloro-21-methyl-4,6,17(20)-pregnatriene-3,21-dione.

5. The compound of claim 1 which is 21-methyl-19-nor-4,9,17(20)-pregnatriene-3,21-dione.

6. A process for the preparation of a compound of claim 1 comprising contacting a compound of the Formula II:

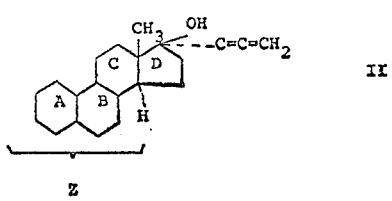

wherein Z is as defined in claim 1, with a strongly acidic agent in the presence of hydroxy anion, (lower) acyloxy anion or (lower) alkoxy anion.

7. A process of claim 6 wherein the Z moiety of the compound of Formula II is in the protected form, in the presence of hydroxy anion.

8. A process of claim 6 wherein the strongly acidic agent is a mineral acid.

9. A process of claim 8 wherein the strongly acidic agent is hydrochloric acid.

10. A process of claim 6 wherein the strongly acidic agent is an aromatic or lower aliphatic sulfonic acid.

11. A process of claim 10 wherein the strongly acidic agent is p-toluene sulfonic acid.

12. A process of claim 6 which is carried out in the presence of hydroxy anion.

13. A process of claim 6 which is carried out in the presence of lower acyloxy anion.

14. A process of claim 13 wherein the acyloxy anion is acetoxy.

15. A process of claim 6 which is carried out in the presence of lower alkoxy anion.

16. A process of claim 15 wherein the lower alkoxy anion is methoxy.

No references cited.

HENRY A. FRENCH, Primary Examiner

U.S. Cl. X.R.

260—239.55 C, 397.4, 397.45, 397.5; 424—242